(12) United States Patent
Lugez et al.

(10) Patent No.: US 11,815,626 B2
(45) Date of Patent: Nov. 14, 2023

(54) METHOD FOR DETECTING INTENSITY PEAKS OF A SPECULARLY REFLECTED LIGHT BEAM

(71) Applicant: Continental Automotive GmbH, Hannover (DE)

(72) Inventors: Boris Lugez, Toulouse (FR); Thomas Meneyrol, Toulouse (FR)

(73) Assignee: Continental Automotive GmbH

( * ) Notice: Subject to any disclaimer, the term of this patent is extended or adjusted under 35 U.S.C. 154(b) by 1 day.

(21) Appl. No.: 17/767,630

(22) PCT Filed: Nov. 18, 2020

(86) PCT No.: PCT/EP2020/082549
§ 371 (c)(1),
(2) Date: Apr. 8, 2022

(87) PCT Pub. No.: WO2021/099395
PCT Pub. Date: May 27, 2021

(65) Prior Publication Data
US 2023/0243923 A1    Aug. 3, 2023

(30) Foreign Application Priority Data

Nov. 19, 2019 (FR) ...................................... 1912866

(51) Int. Cl.
*G01S 7/48* (2006.01)
*G01S 17/89* (2020.01)
(Continued)

(52) U.S. Cl.
CPC ............ *G01S 7/4808* (2013.01); *G01S 17/89* (2013.01); *G01S 17/931* (2020.01); *G06T 7/248* (2017.01);
(Continued)

(58) Field of Classification Search
None
See application file for complete search history.

(56) References Cited

U.S. PATENT DOCUMENTS 5,003,166 A * 3/1991 Girod ...................... G01S 17/89
250/201.4
2004/0130731 A1   7/2004 Yamaguchi
(Continued)

FOREIGN PATENT DOCUMENTS

DE         4304344 A1    8/1994

OTHER PUBLICATIONS

English Translation of the Written Opinion for International Application No. PCT/EP2020/082549, dated Feb. 19, 2021, 7 pages.
(Continued)

*Primary Examiner* — Hovhannes Baghdasaryan
(74) *Attorney, Agent, or Firm* — RatnerPrestia

(57) ABSTRACT

A method for identifying at least one intensity peak of a specularly reflected light beam including: a step (E1) of detecting at least one intensity peak of a light beam present in a first image taken at instant t; a step (E2) of calculating a vector (N) normal to a surface at each point of the first image associated with an intensity peak detected in step (E1); a step (E3) of calculating a vector (L) of the direction of the incident light beam at each point of the first image taken at instant (t), associated with an intensity peak detected in step (E1); a step (E4) of determining the co-linearity between the normal vector (N) and the vector (L) of the direction of the incident light beam in order to identify an intensity peak of the specularly reflected light beam.

9 Claims, 4 Drawing Sheets

(51) Int. Cl.
*G01S 17/931* (2020.01)
*G06T 7/246* (2017.01)

(52) U.S. Cl.
CPC .............. *G06T 2207/10021* (2013.01); *G06T 2207/10028* (2013.01); *G06T 2207/30252* (2013.01)

(56) References Cited

U.S. PATENT DOCUMENTS

| | | | |
|---|---|---|---|
| 2004/0144910 A1* | 7/2004 | Peck ...................... | G01S 5/163 250/206.2 |
| 2007/0268366 A1* | 11/2007 | Raskar .................. | H04N 23/56 348/143 |
| 2009/0033753 A1* | 2/2009 | Sato ....................... | G03B 15/03 348/E5.022 |
| 2010/0026850 A1* | 2/2010 | Katz ..................... | G01S 17/894 348/E5.022 |
| 2017/0322309 A1 | 11/2017 | Godbaz et al. | |

OTHER PUBLICATIONS

Li. H., et al., "Specular Surface Measurement with Laser Plane Constraint to Reduce Erroneous Points," Robocup 2008: Robot Soccer World Cup XII, [Lecture Notes in Computer Science], Springer Intl. Publishing, Cham, Aug. 6, 2019, pp. 53-63, XPO47516134.

International Search Report and Written Opinion for International Application No. PCT/EP202010825419, dated Feb. 19, 2021, with partial English translation, 10 pages.

International Search Report and Written Opinion for International Application No. PCT/EP24201082549, dated Feb. 19, 2021, 16 pages (French).

* cited by examiner

METHOD FOR DETECTING INTENSITY PEAKS OF A SPECULARLY REFLECTED LIGHT BEAM

CROSS REFERENCE TO RELATED APPLICATIONS

This application is the U.S. National Phase Application of PCT International Application No. PCT/EP2020/082549, filed Nov. 18, 2020, which claims priority to French Patent Application No. 1912866, filed Nov. 19, 2019, the contents of such applications being incorporated by reference herein.

FIELD OF THE INVENTION

The present invention concerns the field of image processing, and more precisely concerns a method for detecting intensity peaks of a specularly reflected light beam present in an image captured by a laser imaging device such as a lidar.

More particularly, the invention aims to detect intensity peaks of the specularly reflected light beam amongst a set of intensity peaks generated in a light beam spectrum reflected by the surface of an object. The invention applies in particular to a motor vehicle comprising an on-board imaging device and a computer implementing such a method, in order for example to provide a three-dimensional reconstruction of the vehicle's environment.

BACKGROUND OF THE INVENTION

Nowadays, it is known to equip an automotive vehicle with a driving assistance system commonly called ADAS (Advanced Driver Assistance System). Such a system comprises in the known fashion an imaging device, for example a laser such as a lidar (Light Detection And Ranging) mounted for example on the vehicle, which allows generation of a series of images representing the vehicle's environment. These images are then used by a processing unit with the aim of assisting the driver, for example by detecting an obstacle (pedestrians, stopped vehicle, objects on the road etc.), or by estimating the time before collision with the obstacles. The information provided by the images captured by the lidar must therefore be sufficiently reliable and relevant to allow the system to assist the driver of the vehicle.

Lidar is an active optical sensor which emits a laser beam along a sighting axis in the direction of a target. Reflection of the laser beam by the surface of the target is detected by receivers in the lidar. These receivers record the time elapsed between the moment at which the laser pulse was emitted and that at which it was received by the sensor, in order to calculate the distance between the sensor and the target. These distance measurements collected by the lidar and associated with positioning data are transformed into measurements of actual three-dimensional points in the target. Supplementary data are associated with each of the generated points, such as the intensity of the reflected light measured by the lidar receivers, the angle of incidence of the laser beam on the target, i.e. the angle between the laser beam and the normal to the surface of the target.

It is also possible to obtain a set of 3D points by coupling a stereo camera with an infrared emitter, and thus have a 3D reconstruction of the scene observed by the camera at each instant in time.

From the set of 3D points generated by the lidar and obtained at two successive capture instants, it is known for example to use contiguous image zone processing techniques to detect points of interest present in an image. One of the techniques is to detect the center of mass (blob) of zones of interest as points of interest, such as for example intensity peaks. This technique allows monitoring of points in the images generated by the lidar. Such monitoring allows reconstruction of the three-dimensional environment observed by the vehicle, so as to take into account the dynamics of the observed scene and the trajectory of the vehicle in order to assist the driver in driving.

Several methods may be used to detect intensity peaks within an image:
  threshold of intensity: extraction of a peak as soon as the signal exceeds a fixed threshold;
  convolution with a Gaussian core: extraction of a peak when convolution of the pixel of the image with a Gaussian core is locally maximal in the image.

When a light beam meets the surface of an object, the light may be reflected in two ways:
  diffusely: isotropic reflection with the same intensity;
  specularly: direction of the reflected ray symmetrical with the ray emitted relative to the normal to the surface.

According to a known model, the intensity of the light reflected on a surface of an object results from the association of three terms: intensity of the ambient light $I_a$, intensity of the diffuse light $I_d$, and intensity of the specularly reflected light $I_s$.

With reference to FIG. 1A, the light beam of the lidar flash is emitted by the laser imaging device in the direction of the surface of the object in an emission direction (L) intersecting the object at point $P_i$ ($x_i$, $y_i$, $z_i$). The incident light beam forms an angle of incidence $\theta$ with the normal (N) to the surface of an object 1. The light beam is reflected specularly in a direction (R). The intensity of the reflected light beam is detected by sensors in a detection direction (D). The detection direction (D) and the direction of the specularly reflected light beam (R) form an angle $\alpha$.

The expression of the intensity of the received reflected light measured by the sensors is defined by the following equation: $I_r = I_a + I_d + I_s$. $I_a$ is the intensity of the ambient light and is equal to a constant which is measured and compensated by subtraction. $I_d$ is the intensity of the diffusely reflected light and is defined according to the equation $I_d = R_d \cdot \cos\theta \cdot (1/d^2)$, where $R_d$ is a coefficient of diffuse reflection, $\theta$ is the angle of incidence and d the distance between the sensors and point $P_i$. $I_s$ is the intensity of the specularly reflected light and is defined by the equation $I_s = W \cdot (\cos\alpha)^n \cdot (1/d^2)$, where W is a coefficient of specular reflection, $\alpha$ is the angle between the direction of the specularly reflected light beam (R) and the direction of detection (D) by the sensors of the imaging device, n is a power which models the light reflected specularly by the object, n being an empirical number generally lying between 1 and 200.

FIG. 1B illustrates a particular configuration in which the lidar flash is used as an image capture device, and consequently the emission direction (L) of the light beam and the detection direction (D) of the reflected light beam are co-linear, angle $\alpha$ is then equal to twice the angle of incidence $\theta$, the angle between the incident light beam direction (L) and the surface normal (N). The intensity of the specularly reflected light beam is defined by the equation $I_s = W(\cos 2\theta)^n \cdot 1/d^2$.

In the case where $\theta$ is zero, i.e. in the configuration in which the direction of the specularly reflected light beam (R) is also co-linear to the direction of the normal (N) to the surface of the object at point $P_i$ and to the detection direction (D), the intensity of the specularly reflected light beam detected is in this case maximal: $I_s^{max}=W/d^2$.

FIG. 2A shows an image of the intensity of the light beam reflected by an object recorded by a lidar flash. FIG. 2B illustrates an exemplary curve 4 representing a profile of intensity of specularly reflected light along a line D-D in the intensity image of FIG. 2A, with the abscissa showing the position along axis D and the ordinate the intensity of the specularly reflected light. The intensity of the specularly reflected light is maximal at the level of the reflection 2 on the image of FIG. 2A. In the remainder of the description, the maximal intensity 3 of the specularly reflected light in the curve is designated by the term "specular intensity peak".

It is known that the position of the specular intensity peaks is information which is decorrelated relative to the movement of the lidar flash over the course of time. In fact these are generated only when the tangent surface at a point on the target is oriented perpendicularly to the incident light. Thus these intensity peaks depend entirely on the orientation of surfaces constituting the objects.

Consequently, the presence of these specular intensity peaks may lead to errors in image processing techniques based on the identification of characteristic points by means of intensity peaks, thus creating erroneous image associations. In fact, since the points identified as being characteristic points of an image are decorrelated relative to the movement of the lidar, they do not allow determination of the movement of the point and may lead to determination of an erroneous movement of the object. Thus a 3D reconstruction of the vehicle's environment or determination of the vehicle trajectory partly based on these points may be erroneous, and may lead to errors in the systems providing driving assistance to the driver.

SUMMARY OF THE INVENTION

An aspect of the present invention aims to partially remedy these drawbacks by proposing a solution which is both simple and easy to implement, by proposing to detect specular intensity peaks so as to be able to eliminate these, in order to make the image processing technique more reliable and accurate.

To this end, according to an embodiment, the invention is a method for identifying at least one intensity peak of a specularly reflected light beam present in a sequence of images taken by an imaging device, said image sequence comprising at least a first image taken at instant t, each of the images being obtained from a set of three-dimensional points $P_i$ ($x_i$, $y_i$, $z_i$) generated by said imaging device, each of the points being associated with information on the intensity of the reflected light beam received by a set of sensors of said imaging device, the method comprising the following steps:
  a. a step (E1) of detecting at least one intensity peak of a light beam present in said at least one first image taken at instant t;
  b. a step (E2) of calculating a vector (N) normal to a surface at each point of said at least one first image taken at instant (t), associated with an intensity peak detected in step (E1);
  c. a step (E3) of calculating a vector (L) of the direction of the incident light beam at each point of said at least one image taken at instant t, associated with an intensity peak detected in step (E1);
  d. a step (E4) of determining the co-linearity between the normal vector (N) and the vector (L) of the direction of the incident light beam in order to identify at least one intensity peak of the specularly reflected light beam amongst said at least one intensity peak detected in step (E1).

Thus, by distinguishing the points associated with specular intensity peaks amongst a plurality of points associated with intensity peaks directly from images taken by one of the laser imaging devices of the driving assistance system, the method according to the invention allows avoidance of errors of association of points of interest in the images, made during image processing based on points having similar physical properties such as the intensity peak of the reflected light.

In another embodiment of the invention, the method also comprises a consolidation phase comprising the following steps:
  e. a step (E5) of calculating a new position at instant t+1 for each of the points associated with an intensity peak of the specularly reflected light beam determined in step (E4), said calculation being performed from the known position of said points at instant t and the geometry linked to movement of the imaging device between instant t and instant t+1;
  f. a step (E6) of detecting at least one intensity peak of the reflected light beam in at least one second image taken at instant t+1;
  g. a step (E7) of comparison between the position at instant t+1 of the points associated with the intensity peaks of the specularly reflected light beam calculated in step (E5) and the position at instant t+1 of the points associated with the intensity peaks of the light beam determined in step (E6), in order to determine whether the points identified in step (E4) as being points associated with the intensity peaks of the specularly reflected light beam are effectively decorrelated relative to the movement of said imaging device.

According to an embodiment of the invention, the step (E1) of detecting at least one intensity peak is based on a so-called blob detection technique.

According to another embodiment of the invention, the step (E2) of calculating a vector (N) normal to a surface at each point $P_i$ ($x_i$, $y_i$, $z_i$) of said at least one first image taken at instant t comprises the following sub-steps:
  b1. selecting two adjacent points $P_{i+1}$, $P_{i+2}$ for each point $P_i$ ($x_i$, $y_i$, $z_i$) associated with an intensity peak of the reflected light beam detected in step E1;
  b2. forming two vectors $u_1$ ($P_iP_{i+1}$) and $u_2$ ($P_iP_{i+2}$) from the three points $P_i$, $P_{i+1}$, $P_{i+2}$;
  b3. calculating the normal (N) resulting from the vectorial product between the two vectors.

Preferably, each of the points corresponds to a pixel of the image.

According to a variant of the invention, said imaging device is a lidar flash device configured to generate a set of points $P_i$ ($x_i$, $y_i$, $z_i$).

According to another variant of the invention, said imaging device is a system of stereo cameras coupled to an infrared emitter configured to generate a set of three-dimensional points $P_i$ ($x_i$, $y_i$, $z_i$).

According to another aspect, the invention proposes a computer for a motor vehicle, intended to detect at least one intensity peak of a specularly reflected light beam present in a sequence of images taken by an imaging device, said image sequence comprising at least one first image taken at instant t, each of the images being obtained from a set of three-dimensional points $P_i$ ($x_i$, $y_i$, $z_i$) generated by said imaging device, each of the points being associated with information on the intensity of the reflected light beam received by a set of sensors, the computer being configured for:

a. detecting in a step (E1) at least one intensity peak of a light beam present in said at least one first image taken at instant t;
b. calculating in a step (E2) a vector (N) normal to a surface at each point of said at least one first image taken at instant t, associated with an intensity peak detected in step (E1);
c. calculating in a step (E3) a vector (L) of the direction of the incident light beam at each point of said at least one first image taken at instant (t), associated with an intensity peak detected in step (E1);
d. determining in a step (E4) the co-linearity between the normal vector (N) and the vector (L) of the direction of the incident light beam in order to identify at least one intensity peak of the specularly reflected light beam amongst said at least one intensity peak detected in step (E1).

According to an embodiment of the invention, the computer is furthermore configured for:

e. calculating in a step (E5) a new position at instant t+1 for each of the points associated with an intensity peak of the specularly reflected light beam determined in step (E4), said calculation being performed from the known position of said points at instant t and the geometry linked to movement of the imaging device between instant t and instant t+1;
f. detecting in a step (E6) at least one intensity peak of a light beam in said at least one second image taken at instant t+1;
g. comparing in a step (E7) the position at instant t+1 of the points associated with the intensity peaks of the specularly reflected light beam calculated in step (E5) and the position at instant t+1 of the points associated with the intensity peaks of the light beam determined in step (E6), in order to determine whether the points identified in step (E4) as being points associated with the intensity peaks of the specularly reflected light beam are effectively decorrelated relative to the movement of said imaging device.

According to yet another aspect, the invention concerns a motor vehicle comprising an imaging device and a computer as defined above, connected to said imaging device so as to receive at least one sequence of images captured by said imaging device in order to detect said at least one intensity peak of the specularly reflected light beam in the images.

BRIEF DESCRIPTION OF THE DRAWINGS

Other features, details and advantages of aspects of the invention will become apparent from reading the following detailed description and analyzing the appended drawings, in which.

DESCRIPTION OF THE EMBODIMENTS

The drawings and descriptions below essentially contain elements of definite character. They may therefore not only be used to improve understanding of the present invention but also contribute to the definition thereof, as applicable.

Figure 5:
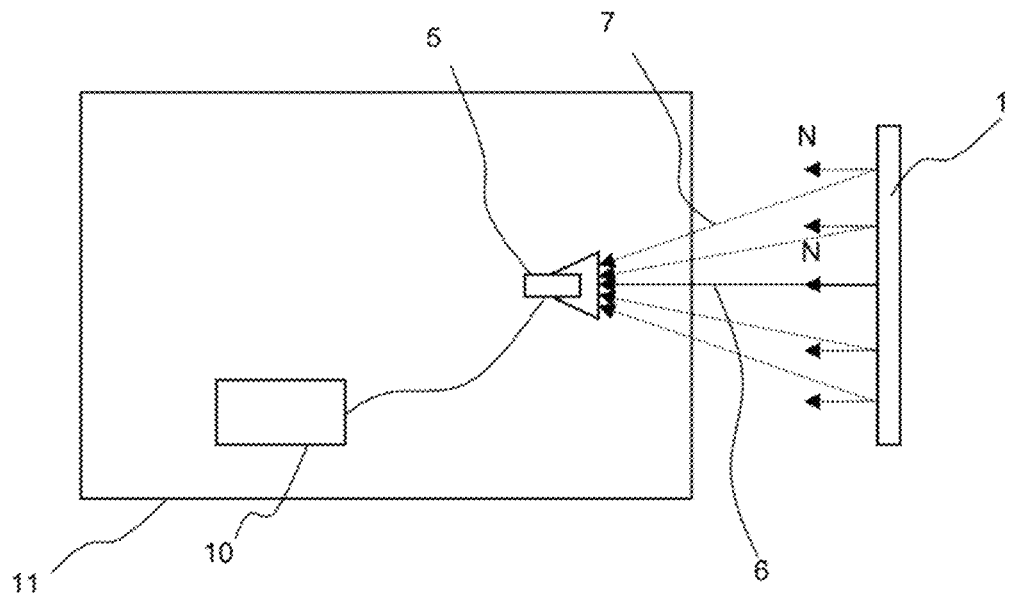
FIG. 5 illustrates schematically an example of illumination at a plurality of points $P_i$ ($x_i$, $y_i$, $z_i$) of the surface of an object by a light beam.

According to the present disclosure and with reference to FIG. 5, a motor vehicle 11 comprises a driving assistance system comprising an imaging device 5 mounted in the vehicle and a computer 10 allowing processing of the images captured by said imaging device.

The imaging device may for example be formed by a system of two cameras coupled to an infrared emitter, which may be mounted on the upper part of the front windscreen of the vehicle so as to film the road on which the vehicle is travelling and the environment of the vehicle within the field of vision of the two cameras. It is noted however that the cameras may be mounted at a different location on the front part of the vehicle. In the known fashion, the cameras allow generation of a set of points or a cloud of three-dimensional points, each of the points being associated with coordinates (x, y, z). In addition, sensors are also coupled to the cameras in order to associate with each point information on the intensity of a light beam emitted by the emitter and reflected on an object in the environment of the vehicle.

The imaging device may also be a lidar (Light Detection And Ranging), which is another example of an imaging device mounted on the vehicle to reconstruct the environment of the vehicle. In the known fashion, the lidar allows generation of a set of points or a cloud of three-dimensional points, each of the points being associated with coordinates (x, y, z). The lidar also comprises a network of sensors in order to associate with each point information on the intensity of the reflected light beam.

Preferably, the computer 10 and the imaging device 5 are implemented by a same physical entity. As a variant, they may each be constituted by a separate physical entity and connected together by a wired connection or a communication network.

Figure 1A:
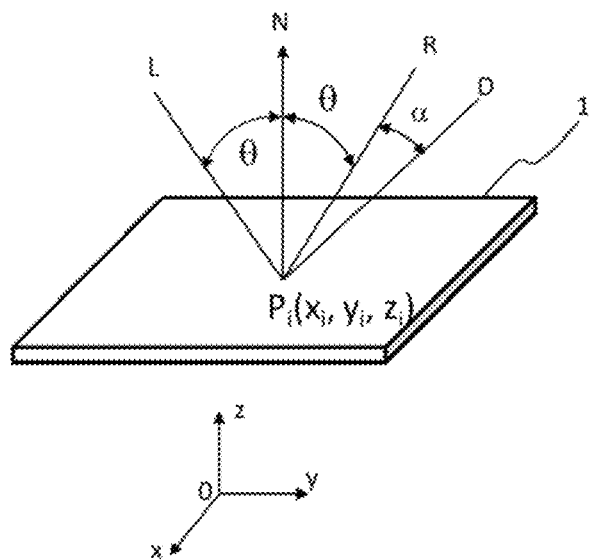
FIG. 1A illustrates schematically a configuration of illumination at a point $P_i$ ($x_i$, $y_i$, $z_i$) of the surface of an object by a light beam in the case of a general configuration.
Figure 1B:
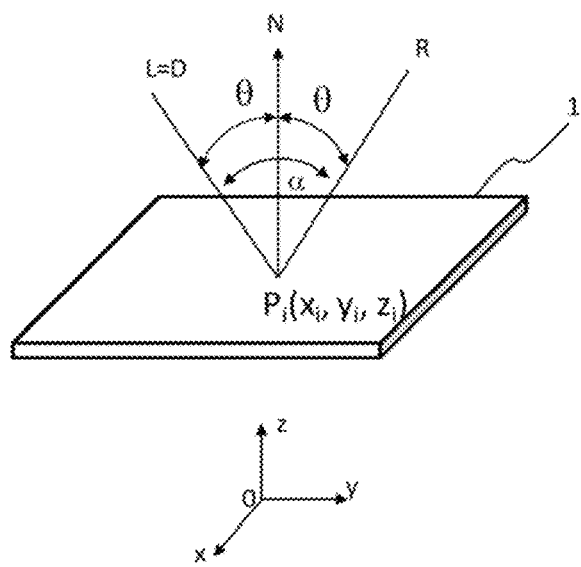
FIG. 1B illustrates schematically another configuration of illumination at a point $P_i$ ($x_i$, $y_i$, $z_i$) of the surface of an object by a light beam in the case where the direction of the incident light beam (L) and the direction of detection of the reflected light beam (D) are co-linear.
Figure 2A:
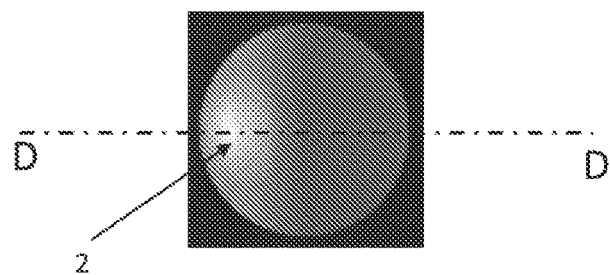
FIG. 2A illustrates schematically an example of an intensity image measured by a lidar.
Figure 2B:
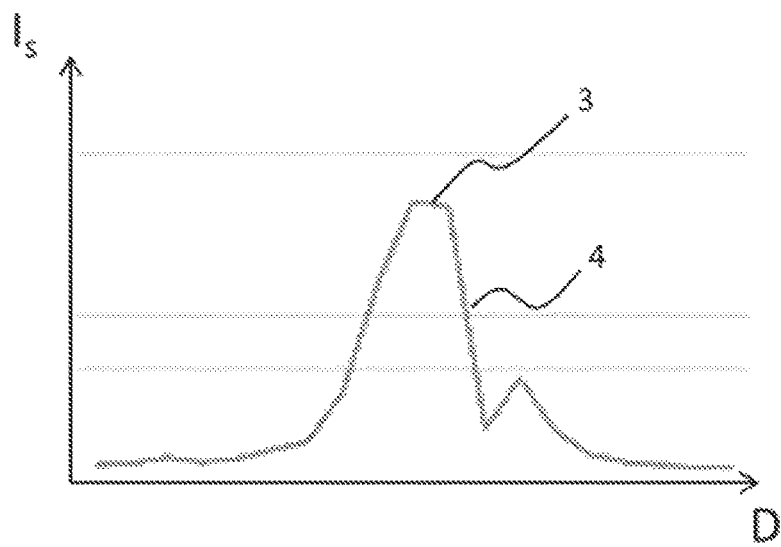
FIG. 2B illustrates schematically a curve of intensity of specularly reflected light measured by the lidar along a line D-D in the intensity image of FIG. 2A, with the abscissa showing the position along the line D-D and the ordinate the intensity of the specularly reflected light.
Figure 3:
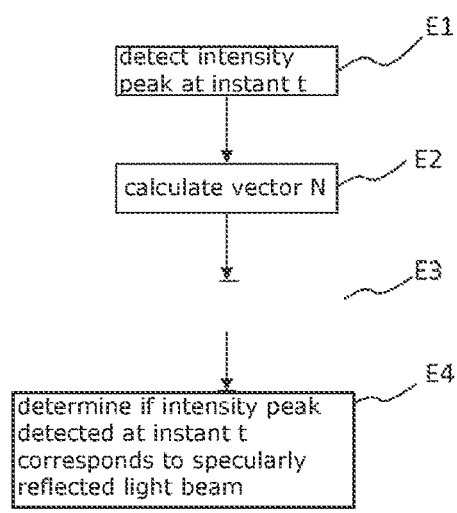
FIG. 3 illustrates a flow diagram of one embodiment of the method according to the invention.
Figure 4:
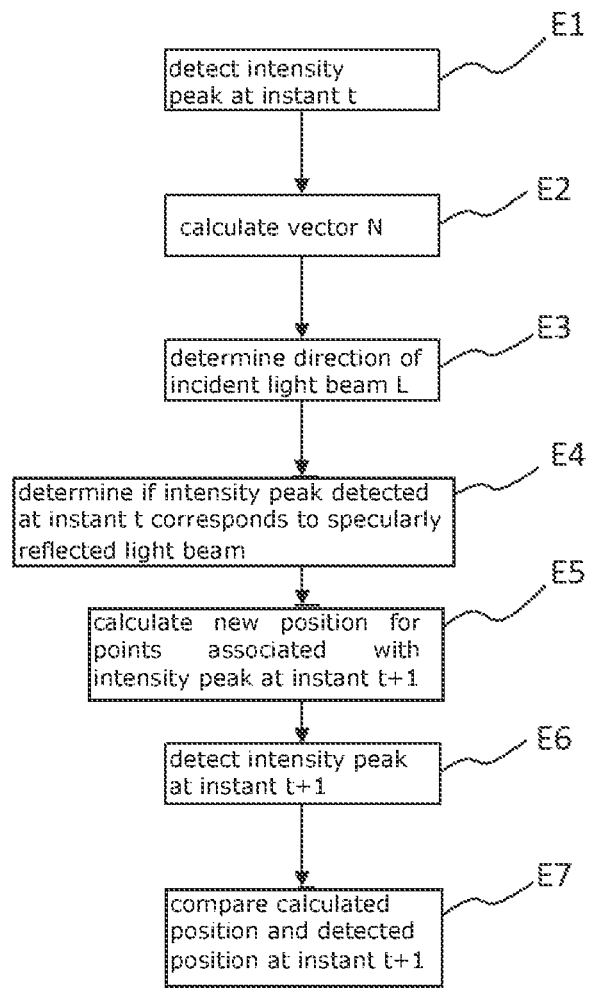
FIG. 4 illustrates a flow diagram of another embodiment of the method according to the invention.

In the following description and with reference to FIGS. 1B and 5, we will take as an example of an imaging device a lidar 5 which is illuminating a surface of an object 1. More precisely, we have a configuration in which the direction of emission of the light beam (L) and the direction of detection of the reflected light beam (D) are co-linear.

The computer 10 comprises a calculation module for generating the three-dimensional environment observed by the vehicle or the trajectory of the vehicle from a sequence of images captured and recorded by the lidar 5 in order to assist the driver in driving.

In the sense of the present invention, a sequence of images comprises a succession of images varying over time, generated for example by the light are at a given frequency. A sequence of images comprises at least a first image taken at instant t and a second image taken at instant t+1.

The computer is also configured for a plurality of tasks allowing determination of points associated with an intensity peak of the specularly reflected light beam in the sequence of images.

According to the invention, a point corresponds to an actual element of the vehicle's environment constructed from a cloud of points acquired by the lidar. A point is represented in the images in the form of a pixel or a plurality of pixels.

In the following description and with reference to FIGS. 3 to 6, an example is given of determination of a plurality of specular intensity peaks in an image. It is however also possible to duplicate the solution described above in order to determine specular intensity peaks in a plurality of images.

In a preliminary step (E0), the lidar generates a sequence of images representing the vehicle's environment, which it transmits to the computer.

In a first step (E1), the computer determines the presence of at least one intensity peak of the reflected light beam in a first image taken at instant t.

The detection of intensity peaks (also known as blob detection) in an image is based on a known method of image processing, which consists of extracting regions of interest showing significant characteristics as having a locally maximal intensity, the center of mass of these regions being known as blobs. The method consists of convoluting the image taken at instant t with a convolution mask or core. More precisely, convolution consists of scanning the image with the mask. In other words, the convolution operation consists of convoluting each pixel with a convolution core. The blobs of luminosity in the image are detected as being pixels which maximize the result of convolution. For example, the convolution core may be a Gaussian type core. Thus the computer allows detection of pixels or points with an intensity peak of the light beam.

Figure 6:
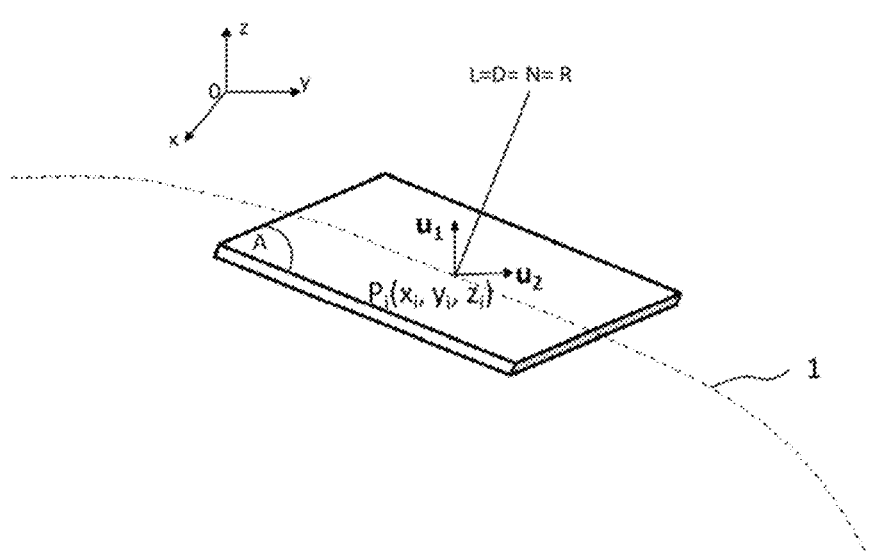
FIG. 6 illustrates schematically an example of illumination at a point $P_i$ of a locally flat and tangent surface (A) at a point P ($x_i$, $y_i$, $z_i$) of an object, and two vectors $u_1$, $u_2$ of the tangent surface formed by the point $P_i$ and two points adjacent to point $P_i$.

In a second step (E2) and with reference to FIG. 6, the computer is configured to calculate a vector (N) normal to a tangent surface (A) at each of the points $P_i$ having an intensity peak of the light beam detected in step (E1). It is hypothesised that the surface (A) of the object 1 at point $P_i$ is locally flat. In the known fashion, the normal to the surface at point $P_i$ is defined by the vectorial product of two vectors $u_1$ ($P_iP_{i+1}$) and $u_2$ ($P_iP_{i+2}$) formed between the point $P_i$ and two points $P_{i+1}$ and $P_{i+2}$ adjacent to point $P_i$. The two adjacent points are selected such that the three points are not co-linear. The vector resulting from the vectorial product is a vector normal to the tangent surface (A) at point $P_i$.

In a third step (E3), the computer determines the direction of the incident light beam (L) at each point $P_i$ having been identified as a point associated with an intensity peak in step (E1).

In a fourth step (E4), to determine whether the intensity peak determined in step (E1) corresponds to a specularly reflected light beam, i.e. a reflected beam generated by a surface of the object perpendicular to the incident light beam at point $P_i$, the computer determines whether the direction of the incident light beam (L) is co-linear with the surface normal (N) at this point $P_i$. For this, the computer is configured to calculate the vectorial product between the normal vector (N) and the vector of the direction of the incident light beam (L) in order to determine whether or not the normal vector (N) and the vector (L) are co-linear at point $P_i$. In other words, if the two vectors are co-linear at point $P_i$, the intensity peak generated at this point corresponds to a specular intensity peak.

Advantageously, the method of the present disclosure also comprises a consolidation phase to determine whether the intensity peaks identified as being specular intensity peaks in step (E4) are effectively decorrelated relative to the movement of the lidar 5.

In a step E5, the computer calculates a new position for each of the points associated with an intensity peak of the specularly reflected light beam determined in step (E4). This new position corresponds to a theoretical position which the point $P_i$ associated with a specular intensity peak should have had at instant t+1. This position at instant t+1 is deducted from the known position of point $P_i$ associated with the specular intensity peak at instant t and the geometry linked to the movement of the lidar between instant t and instant t+1.

The computer is configured, in a step (E6), to duplicate step (E1) in order to detect at least one intensity peak in at least one second image taken at instant t+1.

Finally, in a step (E7), the computer compares the theoretical position at instant t+1 of points associated with intensity peaks of specular light beams determined in step (E5), and the position at instant t+1 of points associated with the intensity peaks determined in step (E6). In the case where the theoretical position of the points associated with the intensity peaks of the specular light beams calculated in step (E5) is different from the position of the points associated with the intensity peaks determined in step (E6), it can be confirmed that the points identified in step (E4) as being points associated with specular intensity peaks are effectively decorrelated relative to the movement of the imaging device.

The solution of the present disclosure proposes to detect specular intensity peaks by verifying three characteristic properties:
the intensity peak has a profile of type $cos^n\theta$;
the normal to the surface of the object and the direction of the incident light beam are co-linear;
and finally, the specular intensity peak does not respect the geometry linked to the movement of the lidar.

The solution of the present disclosure allows detection of specular intensity peaks which are poor candidates for image processing methods based on pairing of points having similar characteristics.

The solution of the present invention advantageously allows the use of images taken by an existing imaging device of the driving assistance system in order to reduce errors of association of characteristic points during image processing, which improves the accuracy of monitoring and hence driving assistance.

INDUSTRIAL APPLICATION

The method according to the invention is particularly suitable for processing of images captured by a camera or Lidar system in a driving assistance system of a motor vehicle. It is also advantageously applicable to the blob type image processing technique for achieving associations of contiguous zones in an image from extraction of points having similar physical properties.

The invention claimed is:
1. A method for identifying at least one intensity peak of a specularly reflected light beam, the method comprising:

illuminating a surface of an object by an imaging device in which a direction of emission of an incident light beam and a direction of detection of a reflected light beam are co-linear;

capturing a sequence of images from the surface of the object by the imaging device, wherein the sequence of images comprises at least a first image taken at instant t and a second image taken at instant t+1, each of the images being obtained from a set of three-dimensional points $P_i$ generated by the imaging device, and each of the three-dimensional points $P_i$ being associated with information on an intensity of the reflected light beam received by a set of sensors of the imaging device;

detecting at least one intensity peak of a light beam present in said at least one first image taken at instant t;

calculating a vector normal to the surface of the object at each point of said at least one first image taken at instant t, associated with the at least one intensity peak detected in the at least one first image taken at instant t;

calculating a vector of the direction of the incident light beam at each point of said at least one first image taken at the instant t, associated with the at least one intensity peak detected in the at least one first image taken at instant t;

determining a co-linearity between the normal vector and the vector of the direction of the incident light beam in order to identify at least one intensity peak of the specularly reflected light beam amongst said at least one intensity peak detected in the at least one first image taken at instant t; and comparing a position at the instant t+1 of the points associated with the intensity peaks of the specularity reflected light beam and a position at the instant t+1 of the points associated with the intensity peaks of the light beam to determine whether the points associated with the intensity peaks of the specularly reflected light beam are effectively decorrelated relative to movement of said imaging device.

2. The method as claimed in claim 1, further comprising a consolidation phase comprising:

e. a step of calculating a new position at instant t+1 for each of the points associated with an intensity peak of the specularly reflected light beam, said calculation being performed from the known position of said points at instant t and the geometry linked to movement of the imaging device between instant t and instant t+1; and f. a step of detecting at least one intensity peak of a light beam in said at least one second image taken at instant t+1.

3. The method as claimed in claim 1, wherein the detecting at least one intensity peak is based on a blob detection technique.

4. The method as claimed in claim 1, wherein the calculating the vector normal to the surface of the object at each point $P_i$ of said at least one first image taken at the instant t comprises:

b1. selecting two adjacent points $P_{i+1}$, $P_{i+2}$ for each point $P_i$ associated with an intensity peak of the reflected light beam detected in step E1;

b2. forming two vectors $u_1$ ($P_iP_{i+1}$) and $u_2$ ($P_iP_{i+2}$) from the three points $P_i$, $P_{i+1}$, $P_{i+2}$; and b3. calculating the normal N resulting from the vectorial product between the two vectors.

5. The method as claimed in claim 1, wherein each of the points corresponds to a pixel of the image.

6. The method as claimed in claim 1, wherein said imaging device is a lidar configured to generate a set of three-dimensional points $P_i$.

7. A computer for a motor vehicle configured to detect at least one intensity peak of a specularly reflected light beam present in a sequence of images taken by an imaging device, the computer being configured for:

detecting at least one intensity peak of a light beam present in at least one first image of the sequence of images taken at an instant t, said image sequence comprising at least the first image taken at instant t and a second image taken at instant t+1, each of the images being obtained from a set of three-dimensional points $P_i$ generated by said imaging device, each of the points being associated with information on the intensity of the reflected light beam received by a set of sensors of the imaging device;

calculating a vector normal to a surface at each point of said at least one first image taken at the instant, associated with the at least one intensity peak detected in the at least one first image taken at instant t;

calculating a vector of the direction of the incident light beam at each point of said at least one first image taken at instant t, associated with the at least one intensity peak detected in the at least one first image taken at instant t;

calculating a co-linearity between the normal vector and the vector of the direction of the incident light beam, in order to identify at least one intensity peak of the specularly reflected light beam amongst said at least one intensity peak detected in the at least one first image taken at instant t; and comparing a position at the instant t+1 of the points associated with the intensity peaks of the specularity reflected light beam and a position at the instant t+1 of the points associated with the intensity peaks of the light beam to determine whether the points associated with the intensity peaks of the specularly reflected light beam are effectively decorrelated relative to movement of said imaging device.

8. The computer as claimed in claim 7, further configured for:

e. calculating a new position at instant t+1 for each of the points associated with an intensity peak of the specularly reflected light beam, said calculation being performed from the known position of said points at instant t and the geometry linked to movement of the imaging device between the instant t and the instant t+1; and f. detecting at least one intensity peak of a light beam in at least one second image taken at the instant t+1.

9. A motor vehicle comprising an imaging device and a computer as claimed in claim 7, connected to said imaging device so as to receive at least one sequence of images captured by said imaging device in order to detect said at least one intensity peak of the specularly reflected light beam in the images.

* * * * *